United States Patent
Thomson

(10) Patent No.: US 10,440,179 B2
(45) Date of Patent: Oct. 8, 2019

(54) TRACKING AND PREVENTING MUTE ABUSE BY CONTACT CENTER AGENTS

(71) Applicant: Avaya Inc., Santa Clara, CA (US)

(72) Inventor: Rodney A. Thomson, Westminster, CO (US)

(73) Assignee: Avaya Inc., Santa Clara, CA (US)

( * ) Notice: Subject to any disclaimer, the term of this patent is extended or adjusted under 35 U.S.C. 154(b) by 501 days.

(21) Appl. No.: 14/860,330

(22) Filed: Sep. 21, 2015

(65) Prior Publication Data

US 2017/0085711 A1   Mar. 23, 2017

(51) Int. Cl.
*H04M 1/64* (2006.01)
*H04M 3/51* (2006.01)
*H04M 3/42* (2006.01)
*H04M 3/428* (2006.01)

(52) U.S. Cl.
CPC .......... *H04M 3/5175* (2013.01); *H04M 3/428* (2013.01); *H04M 3/42221* (2013.01)

(58) Field of Classification Search
CPC ................................................. H04M 3/5175
See application file for complete search history.

(56) References Cited

U.S. PATENT DOCUMENTS

| | | | | |
|---|---|---|---|---|
| 5,535,256 A * | 7/1996 | Maloney | ................... | G07C 1/10 379/111 |
| 5,946,375 A * | 8/1999 | Pattison | ................... | G07C 1/10 379/111 |
| 7,023,979 B1 * | 4/2006 | Wu | ...................... | H04M 3/5233 379/265.11 |
| 7,949,552 B2 * | 5/2011 | Korenblit | ............... | G06Q 10/06 379/265.11 |
| 8,160,233 B2 * | 4/2012 | Keren | ................. | H04M 3/5175 379/265.05 |
| 8,634,543 B2 | 1/2014 | Flockhart et al. | | |
| 8,964,958 B2 | 2/2015 | Steiner | | |
| 2004/0008828 A1 * | 1/2004 | Coles | .................. | H04M 3/4936 379/88.01 |
| 2005/0114141 A1 * | 5/2005 | Grody | ..................... | G10L 15/30 704/270 |
| 2010/0235218 A1 | 9/2010 | Erhart et al. | | |
| 2011/0125793 A1 | 5/2011 | Erhart et al. | | |
| 2011/0125826 A1 | 5/2011 | Erhart et al. | | |

* cited by examiner

*Primary Examiner* — Joseph T Phan
(74) *Attorney, Agent, or Firm* — Sheridan Ross P.C.

(57) ABSTRACT

A method and apparatus to detect and prevent mute abuse by contact center agents provided by an application with an event listener in a contact center communication system are described along with various methods and mechanisms for administering the same. Based on predefined thresholds, the event listener can detect and notify a contact center supervisor and/or a systems administrator when certain mute timing thresholds are not met and/or mute timing thresholds are exceeded. If the exceptions provided by the event listener suggest that an agent is deliberately circumventing a metrics scoring system and/or avoiding work by placing a caller on mute rather than accepting and addressing a work item, service observing monitoring, logging, and disciplinary action can occur.

20 Claims, 4 Drawing Sheets

TRACKING AND PREVENTING MUTE ABUSE BY CONTACT CENTER AGENTS

FIELD OF THE DISCLOSURE

The present disclosure is generally directed toward communications and more specifically toward contact centers.

BACKGROUND

Contact center agents are typically hard-working and conscientious workers. However, there are some contact center agents who try to game the system by whatever means necessary. Accidently saying things to customers when the contact center agents think mute is on has long been a problem. Another way to use mute inappropriately has come under scrutiny and is being reported by contact center managers.

Mute abuse is occurring when a contact center agent answers a call and the contact center agent immediately puts the call on mute. The contact center agent is heard in his environment to be answering calls ("Hello? Hello?"). The contact center agent can count the call as having been answered to keep his metrics looking productive without doing any work. Meanwhile, the customer is unaware of what is happening. He hears nothing, so he hangs up. The contact center agent gives the appearance of working when he is in fact dodging calls.

SUMMARY

The mute abuse problem has been identified as an agent behavior problem by contact center managers, but hardphones and softphones are independent devices that do not typically send mute events to a server. Because most monitoring and reporting systems to date rely on the server to provide information on agent activity, the mute abuse problem has to be detected by observing the agent as he answers calls as a service observer in real time and/or by listening to voice recordings. Listening to voice recordings assumes the quality manager knows which calls and agents need to be monitored and/or reviewed or the quality manager randomly and luckily selects calls where the contact center agent answered the call with mute activated.

These and other needs are addressed by the various aspects, embodiments, and configurations of the present disclosure. The present disclosure is directed to a mechanism and an apparatus that provide a soft agent application feature operable to act as an event listener provided by an application. The event listener can capture an event by tracking agents when a call is received. The event listener can send information to a monitoring application including but not limited to call receipt, duration, mute/unmute, etc. The monitoring application may have thresholds set for how quickly a call is placed on mute, duration of the muted portion of the call, duration of the entire call (based on call category), and when the call is released/terminated.

In some embodiments, if the call is muted too quickly, left on mute, and/or terminated right before or immediately after the call is unmuted, the monitoring application may note a specific exception for violating one or more thresholds. The exceptions can be logged and may trigger a notification at any time during or after the call is completed. The notification may be delivered to a supervisor/manager as a pop-up, email, text, outbound call, etc. and can be set based on multiple parameters, including sensitivity of the customer, location of the supervisor/manager, call length/duration, agent history, etc. The supervisor can join the call to service observe at any time before or after a notification or join the next call to assess agent behavior. In an additional embodiment, the supervisor can activate the listener and watch the contact center agent's actions in real time if he or she suspects abuse is happening.

In a non-limiting example, Candace is a supervisor for Ken and Cheryl at The Pterodactyl Company. The supervisors at The Pterodactyl Company have been informed that customers are complaining that when the customers call in, there is no one on the line. The supervisors, including Candace, have a systems administrator investigate. No hardware or software issues are found. The supervisors then suspect that some agents may be muting calls as soon as they are answered to avoid work while maintaining acceptable agent metrics. Candace asks the systems administrator to install an application that contains an event listener that can send exception information to a monitoring application. The systems administrator can set thresholds designed to identify mute abuse. During the first three shifts, nothing happens. Candace receives no event notifications and doesn't hear anything unusual on the floor.

However, on the fourth day, Candace receives a pop-up that Cheryl has answered and muted a call that falls below the minimum threshold for answer and discussion for sales. She takes no action. Two minutes later, Candace receives another pop-up for a call Cheryl has answered and immediately put on mute. Candace walks onto the contact center floor and uses her mobile device to join the next call answered by Cheryl as a Service Observer (SO). Observing Cheryl, Candace does not hear Cheryl greet the caller until after Candace observes Cheryl pressing the mute button and Candace receives a text notification that Cheryl hit the mute button below the set threshold of seconds. As an SO, Candace can hear the confusion in the customer's words and voice prior to the customer disconnecting the call.

Candace hangs up and sends a text to her manager that she needs to take disciplinary action. Candace pushes a button for the monitoring application to save the last five minutes of exceptions as a report and send it to her email and to her manager's email to review. She walks to Cheryl's desk, asks her to enter coaching auxiliary mode, and they go to a small conference room to discuss the issue. Candace warns Cheryl that data from the application will be put in her file by the manager to document the behavior. Candace tells Cheryl that repeated mute abuse activity will result in disciplinary action, including possible termination if the mute abuse continues.

This straightforward mute abuse detection and notification solution alerts supervisors to abuse by contact center agents that might otherwise go unnoticed, saving money and preserving customer satisfaction. These and other advantages will be apparent from the disclosure.

In some embodiments, a method is provided that generally comprises:
  setting a threshold value associated with a minimum amount of time required for a call answered in a contact center without abuse of a mute feature;
  monitoring one or more calls in the contact center;
  determining whether answered calls among the one or more monitored calls comprise a duration at least equal to the threshold value, and for answered calls among the one or monitored calls having a duration that is less than the threshold value, reporting potential abuse of the mute feature;
  wherein the one or more monitored calls correspond to calls directed to a predetermined agent and wherein the one or more monitored calls correspond to calls received during a predetermined time frame;

wherein the one or more monitored calls correspond to calls having a predefined skill, wherein reporting abuse of the mute feature comprises sending a message to at least one supervisor of an agent that answered a call having a duration that is less than the threshold value, wherein the message comprises a text message, and wherein reporting abuse of the mute feature comprises generating a report that identifies an agent that answered the call having a duration that is less than the threshold value along with the duration of the answered call; and further comprising recording the answered call and including the recording as part of the reporting of potential abuse of the mute feature.

The term "automatic" and variations thereof, as used herein, refers to any process or operation done without material human input when the process or operation is performed. However, a process or operation can be automatic, even though performance of the process or operation uses material or immaterial human input, if input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "customer" or "client" denotes a party patronizing, serviced by, or otherwise doing business with a contact center, business, or enterprise.

The terms "listener" and "event listener" as used herein refer to a known or later developed software, hardware, firmware, or combination program that is operable through one or more actions to subscribe to event notifications and provide notification thereof. A listener is notified when a certain event type happens and may receive, process, and notify on event information. Also, while the disclosure is presented in terms of exemplary embodiments, it should be appreciated that individual aspects of the disclosure can be separately claimed.

The phrases "Service Observe" and "Service Observer" as used herein refer to a software feature provided by a communications system wherein a person, referred to as an observer, is typically muted and can hear all parties on a voice call. The Service Observe feature is commonly used by supervisors and trainers when working with contact center agents.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1:
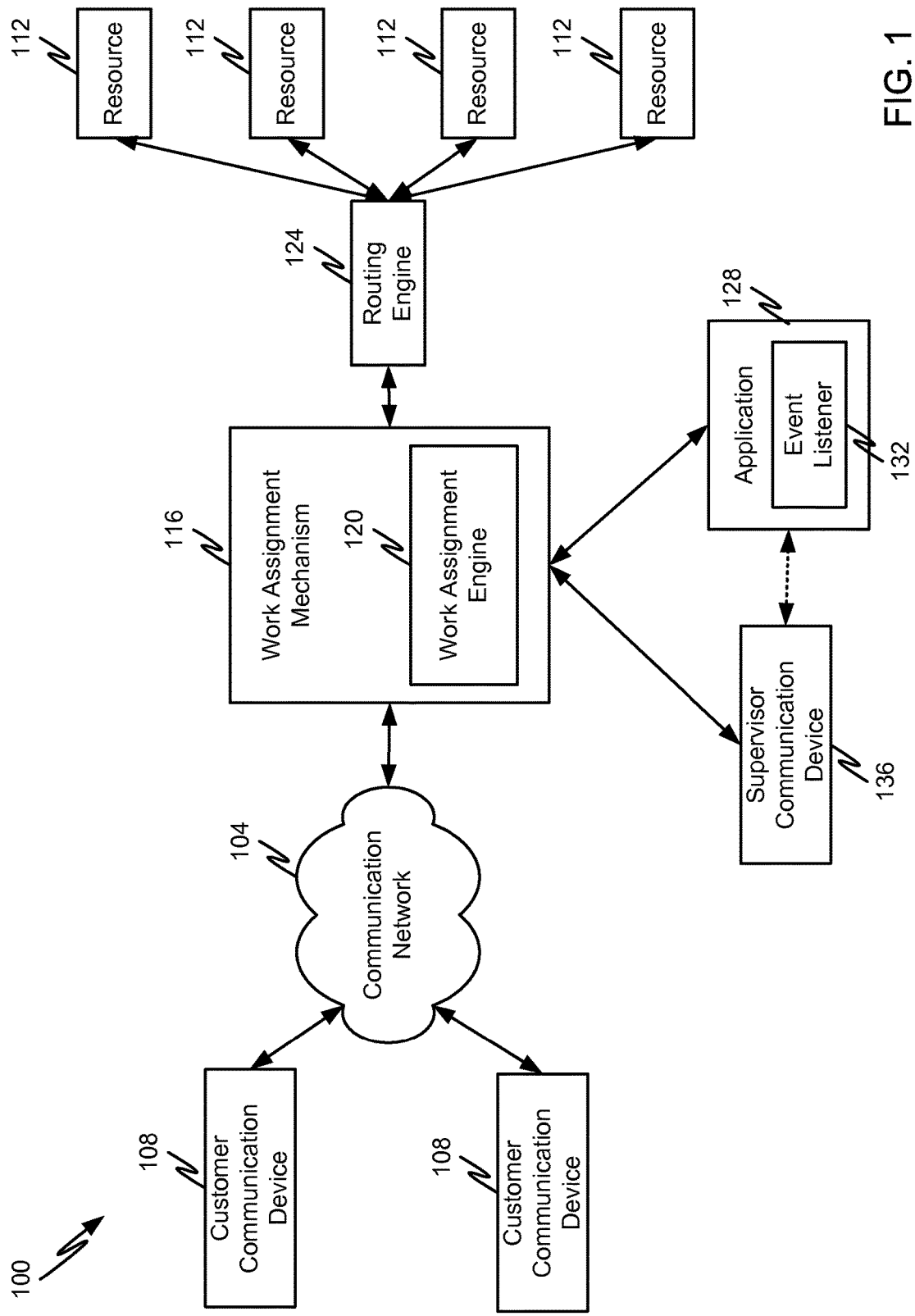
FIG. 1 is a block diagram of a communication system in accordance with embodiments of the present disclosure.

FIG. 1 depicts a communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering a contact center in which a plurality of resources 112 are distributed to handle incoming work items from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. Pat. No. 8,964,958 B2, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. Patent Publication Nos. 2010/0235218, 2011/0125826, and 2011/0125793, each of which are hereby incorporated herein by reference in their entirety.

The communication device 136 may correspond to supervisor communication device or collection of devices. In accordance with at least some embodiments of the present disclosure, a supervisor may utilize the communication device 136 to evaluate, service observe, and help the handling of the work item by a resource 112. The supervisor may utilize the communication device 108 to initiate or respond to interaction regarding work items with the work assignment mechanism 116, elements within or outside of the communication network 104, and to processing resources 112.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 124 to connect the communication device 108 to the assigned resource 112.

Although the routing engine 124 is depicted as being separate from the work assignment mechanism 116, the routing engine 124 may be incorporated into the work assignment mechanism 116 or its functionality may be executed by the work assignment engine 120.

In accordance with at least some embodiments of the present disclosure, the communication devices 108, 136 may comprise any type of known communication equipment or collection of communication equipment. Examples of a suitable communication device 108, 136 include, but are not limited to, a personal computer, laptop, tablet, cellular phone, smartphone, telephone, or combinations thereof. In general, each communication device 108, 136 may be adapted to support video, audio, text, and/or data communications with other communication devices 108, 136 as well as the processing resources 112. The type of medium used by the communication device 108, 136 to communicate with other communication devices 108, 136 or processing resources 112 may depend upon the communication applications available on the communication device 108, 136.

In accordance with at least some embodiments of the present disclosure, the work item can be sent toward a collection of processing resources 112 via the combined efforts of the work assignment mechanism 116 and routing engine 124. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112a-n connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 may be configured to administer and make work assignment decisions in a queueless contact center, as is described in U.S. Pat. No. 8,634,543 B2, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited (or is the optimal processing resource) to handle the processing needs of the work item. In situations of work item surplus, the work assignment engine 120 can also make the opposite determination (i.e., determine optimal assignment of a work item resource to a resource). In some embodiments, the work assignment engine 120 can be configured to achieve true one-to-one matching by utilizing bitmaps/tables and other data structures.

In accordance with at least some embodiments of the present disclosure, an application 128 may comprise a computer program written and designed to provide specific functions for one or more end users. More specifically, the application 128 may be configured to receive requests and data regarding changes in data, commonly referred to as events. The application 128 may implement one or more event listeners 132. An event listener 132 may comprise software operable to subscribe to or "listen" for certain types of attribute changes and other system events. The application 128 containing one or more event listeners 132 may enable the event listeners 132 to detect events based on subscription parameters and may invoke the event listeners 132 in a certain order, if needed. Attribute changes detected by an event listener 132 may include data that has been added, removed, or replaced. Data from communication devices 108, 136, communications system 100 elements, and the event listener 132 may also be logged, analyzed, and reported on. Notifications may be sent by the application 128 and shared with and/or accessed by components connected to the communications system 100.

The application 128 containing the event listener 132 can be deployed on any of the illustrated telecommunication components of the contact center, including resources 112, work assignment mechanism 116, work assignment engine 120, routing engine 124, and supervisor communication device 136. Additionally, the application 128 containing the event listener 132 can be deployed on typical and future contact center components that are known and/or will be developed in the art, including but not limited to web servers, Workforce management (WFM) servers, forecasting servers, access servers, feature servers, media servers, outbound dialers, access gateways, trunk gateways, agent workstations, and other miscellaneous servers, gateways, and communication devices.

Figure 2:
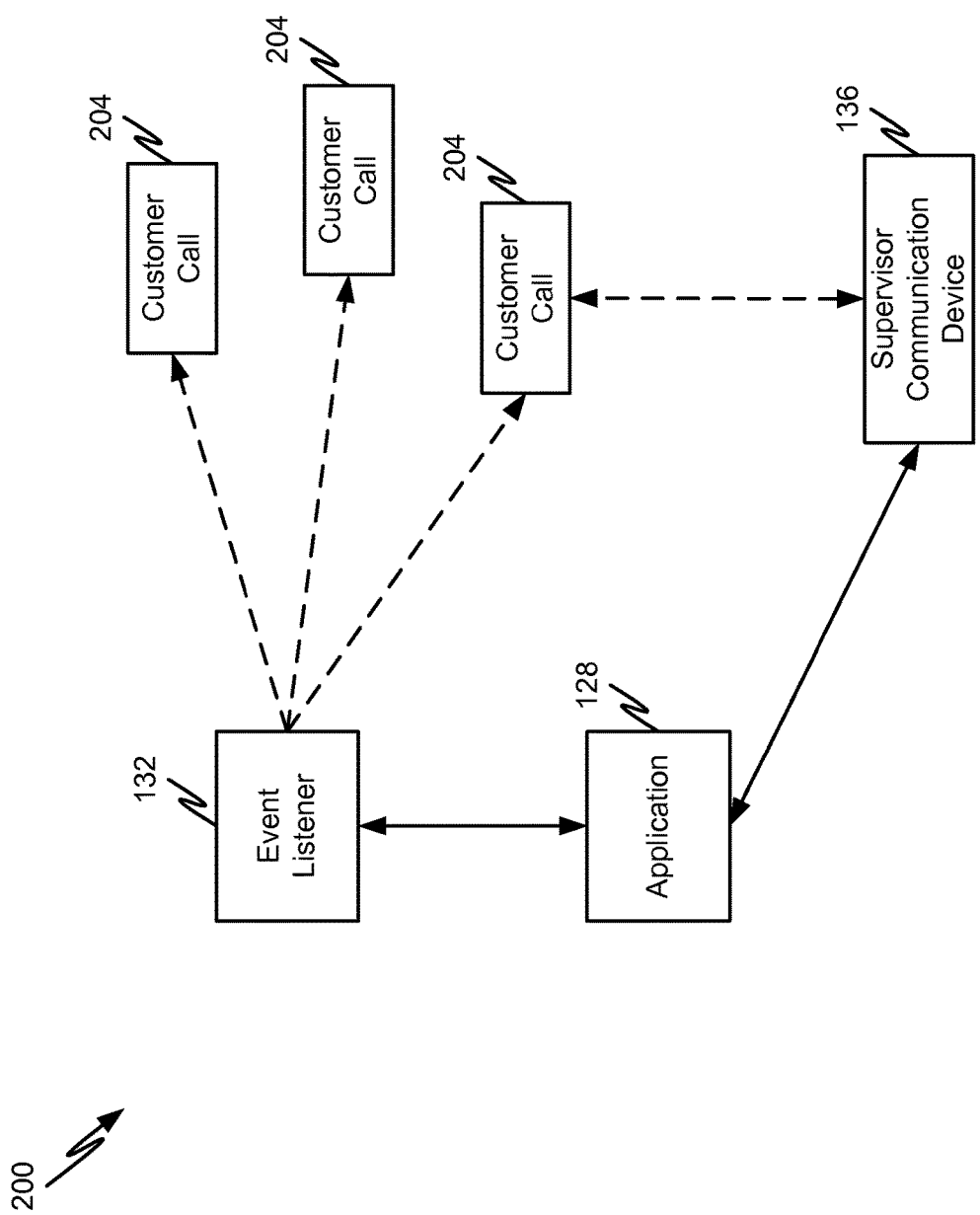
FIG. 2 is a block diagram for a mechanism and apparatus that provide detection for mute abuse in accordance with embodiments of the present disclosure.

FIG. 2 is an illustrative example containing elements of mute abuse detection and notification 200, presented in accordance with embodiments of the present disclosure. Hereinafter, the illustrative example 200 shall be explained with reference to the systems, components, modules, software, structures, etc. described in conjunction with FIG. 1.

The illustrative example 200 may have multiple components, including an application 128, an event listener 132, and a supervisor communication device 136, all of which may be used to interface with one or more customer calls 204. There may be more or fewer elements than shown in FIG. 2. Though shown separately, the event listener 132 may be housed by, invoked, and controlled by the application 128. The application 128 alone or in conjunction with other communication system 100 elements may contain software definitions for thresholds for certain types of data related to voice call events. The event listener 132 can subscribe to and actively monitor one or more customer calls 204 handled by resources 112 received by a contact center for events. Requests for monitoring may be set by a systems administrator or manually requested through the supervisor communication device 136. The event listener 132 may receive data from customer calls 204, as explained in conjunction with FIG. 3. Once the event listener 132 is activated, the event listener 132 may communicate bidirectionally with the application 128 including event data, notifications, changes, etc. The application 128 may communicate bidirectionally with the supervisor communication device 136 and with other elements as necessary in the communication system 100. The supervisor communication device 136 may invoke a service observing feature and participate as a service observer on one or more customer calls 204 once mute abuse is suspected. Pop-ups, email messages, text messages, and outbound calls can be triggered based on multiple parameters. Other data may also be shared among the components discussed for mute abuse detection.

Figure 3:
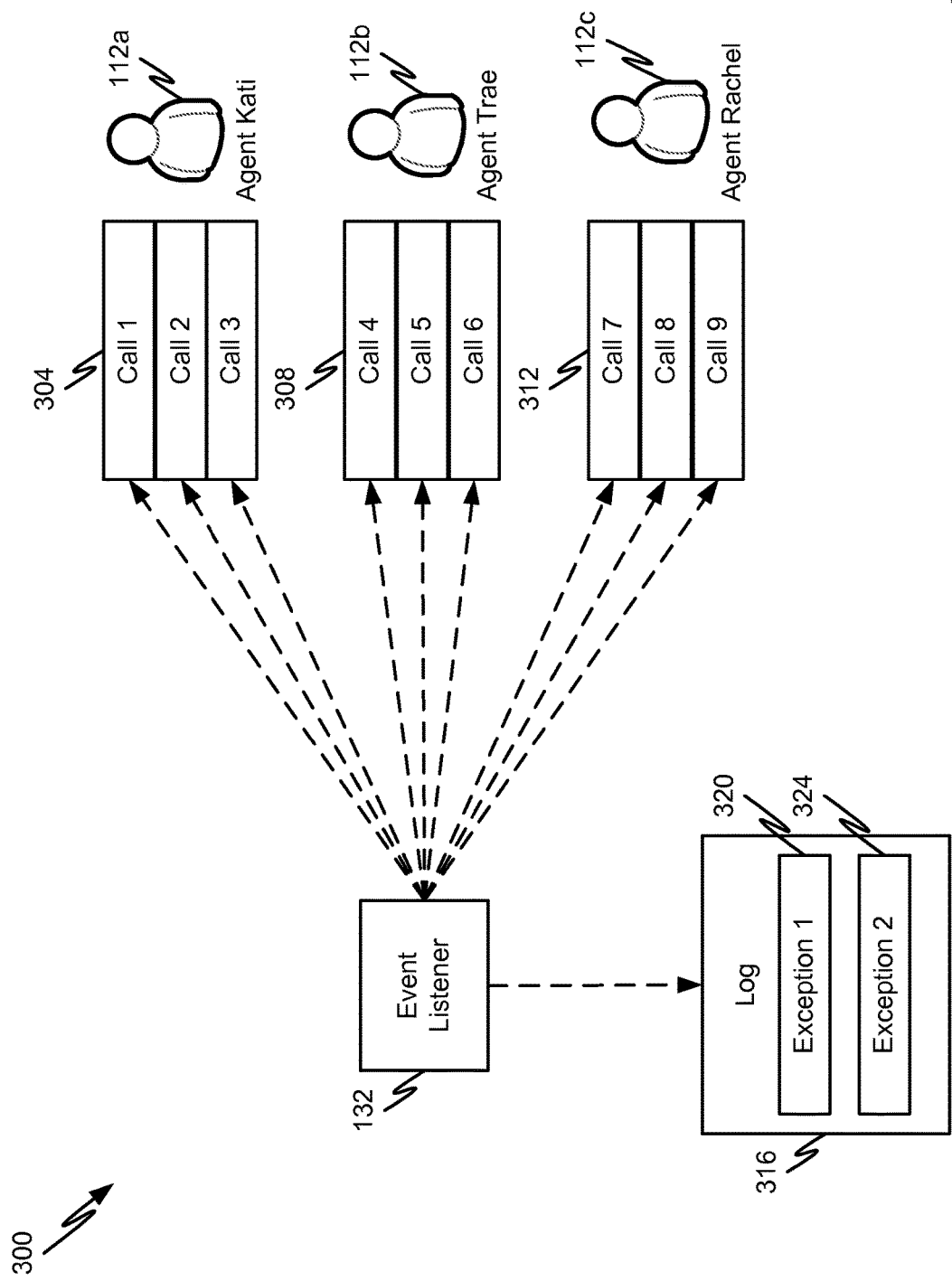
FIG. 3 is an example of tracking and preventing mute abuse in accordance with embodiments of the present disclosure.

With reference now to FIG. 3, an example of tracking and preventing mute abuse 300 is presented in accordance with embodiments of the present disclosure. The mute abuse detection example 300 may include, in some embodiments, an event listener 132 connected via and/or contained within an application 128 which may be owned and operated by an enterprise administering a contact center. The event listener 132 is operable to monitor live telephone calls being handled by contact center agents 112. The event listener 132 subscribes to call streams and has the ability to place exceptions 320, 324 in a log 316, where the log 316 is a repository of data that can be accessed by the contact center supervisor through elements of the communications system 100.

In a non-limiting example, the event listener 132 listens to a bank of calls 304 handled by Agent Kati 112*a* that includes Call 1, Call 2, and Call 3. The event listener 132 listens to a bank of calls 308 handled by Agent Trae 112*b* that includes Call 4, Call 5, and Call 6. The event listener 132 listens to a bank of calls 312 handled by Agent Rachel 112*c* that includes Call 7, Call 8, and Call 9.

The event listener 132 can be activated by a system administrator and/or a contact center supervisor to monitor all calls, monitor calls during a certain timeframe, or monitor calls for specific contact center agents 112*a-c*. In this example 300, the event listener 132 listens to all calls for three agents on shift. Additionally, the communications system 100 records all calls for quality assurance. All call recordings are accessible in near-real time for review by the contact center supervisor and/or other members of a management/administrative team.

During monitoring, the event listener 132 detects that Call 5 in bank of calls 308 answered by Agent Trae 112*b* has a duration of 10 seconds. The predefined threshold for call duration for mute abuse detection has been set at 30 seconds. The 10 second Call 5 answered by Agent Trae 112*b* is recorded. The event listener 132 sends a notification to the log 316 that the 10 second Call 5 answered by Agent Trae 112*b* is below the 30 second threshold. Data is collected and stored by the log 316 as Exception 1 320. Based on the predefined parameters of the event listener 132, the event listener 132 can also send a message, text, pop-up as notification to a supervisor communication device 136 as notification of Exception 1 320.

During monitoring, the event listener 132 detects that Call 7 in bank of calls 312 answered by Agent Rachel 112*c* has a duration of 23 seconds. The predefined threshold for call duration for mute abuse detection has been set at 30 seconds. The 23 second Call 7 answered by Agent Rachel 112*c* is recorded. The event listener 132 sends a notification to the log 316 that the 23 second Call 7 answered by Agent Rachel 112*c* is below the 30 second threshold. Data is collected and stored by the log 316 as Exception 2 324. Based on the predefined parameters of the event listener 132, the event listener 132 can also send the notification to the supervisor communication device 136 as notification of Exception 2 324.

The contact center supervisor and/or other members of a management/administrative team can retrieve the recordings of Call 5 in bank of calls 308 and Call 7 in bank of calls 312 and Exception 1 320 and Exception 2 324 from the log 316. The contact center supervisor in this example reads the data from the log 316 for both exceptions and listens to the recordings for both calls. For Call 5 in bank of calls 308, the recording indicates that the call is a wrong number, explaining the short duration. Using the supervisor communication device 136, the contact center supervisor deletes Exception 1 320 from the log 316 and takes no additional action. For Call 7 in bank of calls 312, the recording indicates that the call is suspicious. Call 7 is answered, but the voice of Agent Rachel 112*c* is not heard. A customer is heard saying, "Hello? Hello?" and then there is a pause of several seconds when nothing is heard, then the customer is heard saying, "Hello?" one more time before giving up and terminating Call 7. Using the supervisor communication device 136, the contact center supervisor retrieves the call recordings for Call 8 and Call 9 in bank of calls 312. Neither recording indicates a mute abuse or other problem. Call 8 and Call 9 in bank of calls 312 are handled normally and well by Agent Rachel 112*c*. The contact center supervisor questions Agent Rachel 112*c* who indicates that when she answered Call 7 in bank of calls 312, she was having problems with her headset. The contact center supervisor leaves Exception 2 324 in the log 316 and notes the log entry in Agent Rachel's file. If for a predetermined time limit of a month the contact center supervisor receives no call exception notifications from the event listener 132 for Agent Rachel 112*c*, the Exception 2 324 in the log 316 will be automatically deleted. If additional and similar exceptions are logged for Agent Rachel 112*c*, inquiries into the equipment failures will be made and disciplinary action may be taken to address multiple instances of mute abuse by Agent Rachel 112*c*.

In an additional embodiment, Agent Rachel 112*c* may use a softphone, a software program for making and receiving calls using a computer instead of a telephone. The softphone may contain a programmed mute button as a soft key which can be monitored by the event listener 132. In a non-limiting example, Agent Rachel 112*c* answers Call 9 in bank of calls 312 and mutes the call at 3 seconds. The 20 second Call 9 answered by Agent Rachel 112*c* is recorded. The local event listener 132 sends event notification directly to the log 316 that the 20 second Call 9 answered by Agent Rachel 112*c* was muted at 3 seconds, below the 10 second threshold for first mute. Data can be collected and stored by the log 316 as an exception. Based on the predefined parameters of the event listener 132, the event listener 132 can also send the notification to the supervisor communication device 136 as soon as the local event is detected.

Figure 4:
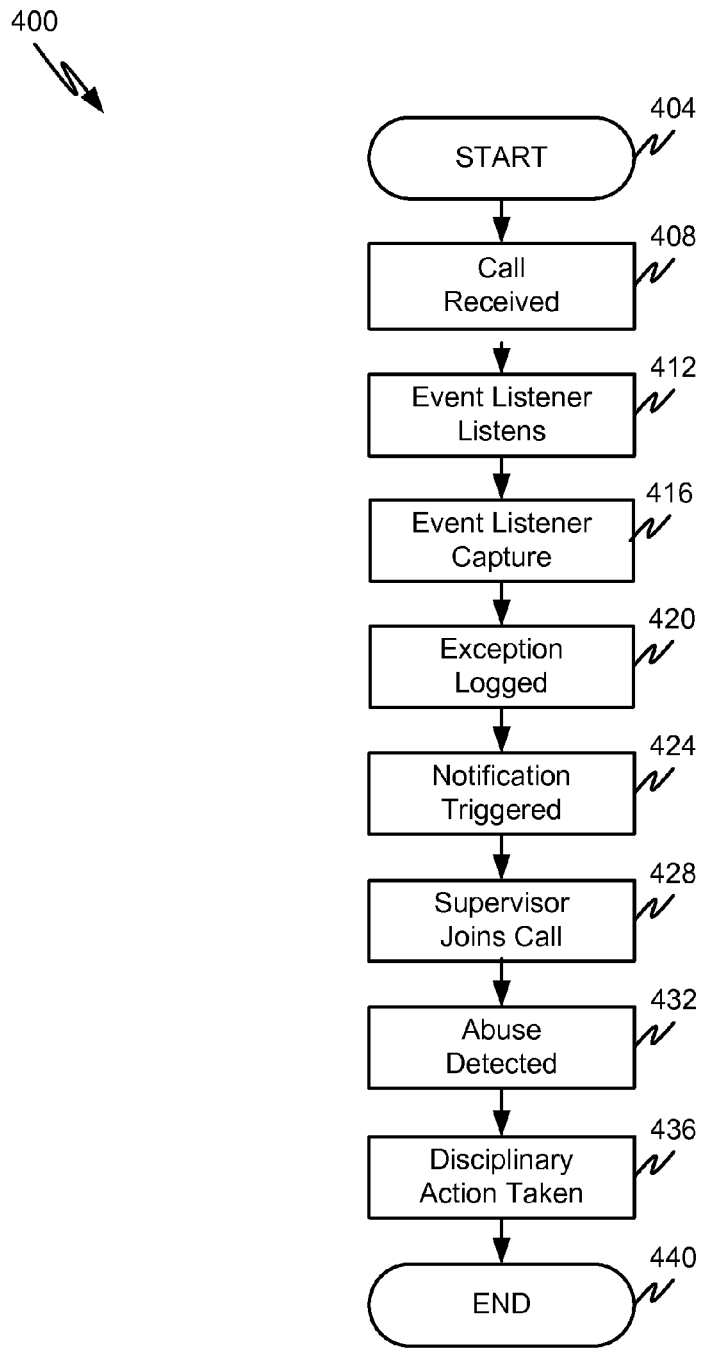
FIG. 4 is a flow diagram for listening for and responding to mute abuse in accordance with embodiments of the present disclosure.

With reference now to FIG. 4, aspects of a method 400 for detection and response to mute abuse in accordance with embodiments of the present disclosure are depicted. Generally, the method 400 begins with a start operation 404 and terminates with an end operation 440. While a general order for the steps of the method 400 are shown in FIG. 4, the method 400 can include more or fewer steps or the order of the steps can be arranged differently than those shown in FIG. 4. The method 400 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 400 shall be explained with reference to the systems, components, modules, software, structures, etc. described in conjunction with FIGS. 1-3.

The method begins at step 404 and continues when a contact center customer initiates a call from a customer communication device 108 and the call is received at the contact center. Once the customer call is received and accepted by a resource 112 (step 408), an event listener 132 in an application 128 may be automatically or manually activated. Once the event listener 132 is activated, the event listener 132 can listen to calls received by one or more agents, attributes, skills, groups, and locations, in step 412. Based on predefined thresholds for when a call is placed on mute, how long the call is on mute, and other mute parameters by call type, the event listener 132 can monitor calls and capture data (step 416) when the call falls under or exceeds one or more predefined thresholds. For example, if a call is muted within five seconds of being answered, the event listener 132 can log an exception, in step 420. When the event listener 132 logs the exception, the event listener 132 can send notification (step 424) to the application 128 which can relay the notification to the supervisor communication device 136 and other communication system 100 components as administered.

Many things can happen as a result of the event detection and notification being sent from the event listener 132. A few examples include, but are not limited to, a supervisor may do nothing, the supervisor may move to the physical vicinity of Agent Rachel 112*c*, and the supervisor may initiate service observing (SO) for the next call Agent Rachel 112*c* accepts and answers. In this example, the supervisor joins the next call in step 428. Agent Rachel 112*c* is unaware that the supervisor is service observing the call as the supervisor is automatically muted by the SO feature and is not privy to the exception and the notification. Agent Rachel 112*c* answers the call, and puts the call on hold after waiting three seconds. The supervisor is actively listening to the call where the abuse is happening in real time, in step 432. Once the customer terminates the call after 15 seconds, the supervisor hangs up the service observing line. The supervisor gets up and walks over to Agent Rachel's 112*c* workstation and asks her to log out. The supervisor explains to Agent Rachel 112*c* that she is being sent home since mute abuse has been detected and disciplinary action is needed (step 436). The supervisor informs Agent Rachel 112*c* that she is to return to the contact center at 9:00 AM for a disciplinary review with him and his manager.

Because of the notification, the supervisor has a strong suspicion that additional cases of mute abuse will be found. The next morning prior to the meeting, the supervisor and his manager review two dozen recordings of Agent Rachel's 112*c* calls. The supervisor and the manager find four cases of mute abuse in addition to the one detected by the event listener 132 and the subsequent call where the supervisor was service observing which also provided an exception. Based on the four cases of mute abuse and his discussion with his manager, the supervisor discusses the incidents with Agent Rachel 112c during the meeting, documents the incidents and the conversation, and fires Agent Rachel 112c. In step 440, the method ends.

It should be appreciated that while embodiments of the present disclosure have been described in connection with typical contact center architecture, embodiments of the present disclosure may apply to queue-based or queueless contact centers.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method, comprising:
   setting a threshold value associated with a minimum amount of time required for a call answered in a contact center, wherein the threshold value associated with the minimum amount of time required for the call answered in the contact center is used to identify a potential abuse of a mute feature;
   monitoring one or more calls in the contact center;
   determining whether answered calls among the one or more monitored calls comprise a duration at least equal to the threshold value; and
   for answered calls among the one or more monitored calls having a duration that is less than the threshold value, reporting the potential abuse of the mute feature.

2. The method of claim 1, wherein reporting the potential abuse of the mute feature is also based on how quickly and how long the call having the duration that is less than the threshold value is muted.

3. The method of claim 2, wherein reporting the potential abuse of the mute feature is also based on whether the call having the duration that is less than the threshold value is terminated right before or immediately after being unmuted.

4. The method of claim 1, wherein the one or more monitored calls correspond to calls having a predefined skill.

5. The method of claim 1, wherein reporting abuse of the mute feature comprises sending a message to at least one supervisor of a contact center agent that answered a call having the duration that is less than the threshold value.

6. The method of claim 5, wherein, in response to the sent message, a service observing is initiated for a next call or a listener is activated to monitor, in real-time, the call having the duration that is less than the threshold value.

7. The method of claim 1, wherein reporting abuse of the mute feature comprises generating a report that identifies a contact center agent that answered the call having the duration that is less than the threshold value along with the duration of the answered call.

8. The method of claim 1, further comprising recording the answered call and including the recording as part of the reporting of potential abuse of the mute feature.

9. A contact center, comprising:
   a telecommunication component that is connected to a communication network of the contact center, thereby enabling the telecommunication component to send and receive information regarding calls in the contact center; and
   an event listener that monitors one or more calls in the contact center, determines whether answered calls among the one or more monitored calls comprise a duration at least equal to a threshold value and wherein the threshold value is associated with a minimum amount of time required for the answered calls to identify a potential abuse of a mute feature by a contact center agent, and, for answered calls among the one or more monitored calls having a duration that is less than the threshold value, reports the potential abuse of the mute feature by the contact center agent.

10. The contact center of claim 9, wherein the one or more monitored calls correspond to calls directed to a predetermined contact center agent.

11. The contact center of claim 9, further comprising:
    a recording contact center component that records the one or more answered calls and includes the recordings as part of the reporting of potential abuse of the mute feature.

12. The contact center of claim 9, further comprising:
    an application that sends a message to at least one supervisor of the contact center agent that answered a call having the duration that is less than the threshold value and generates a report that identifies the contact center agent that answered the call having the duration that is less than the threshold value along with the duration of the answered call.

13. The contact center of claim 12, wherein the message comprises a text message.

14. A communication system, comprising:
    an event listener deployed at a telecommunication component of a contact center, wherein the event listener determines whether answered calls among one or more monitored calls comprise a duration at least equal to a threshold value and wherein the threshold value is associated with a minimum amount of time required for the answered calls to identify a potential abuse of a mute feature by a contact center agent, and, for answered calls having a duration that is less than the threshold value, reports the potential abuse of the mute feature by the contact center agent.

15. The communication system of claim 14, wherein the one or more monitored calls correspond to calls directed to a predetermined contact center agent, and wherein the one or more monitored calls correspond to calls received during a predetermined time frame.

16. The communication system of claim 14, wherein reporting abuse of the mute feature comprises sending a message to at least one supervisor of the contact center agent that answered a call having the duration that is less than the threshold value.

17. The communication system of claim 16, wherein the message comprises a text message.

18. The communication system of claim 14, further comprising:
   a recording component at a telecommunication component of a contact center, wherein the recording component records and stores the one or more answered calls and includes the recordings as part of the reporting of potential abuse of the mute feature.

19. The communication system of claim 14, wherein the wherein the one or more monitored calls correspond to calls having a predefined skill.

20. The communication system of claim 14, wherein reporting abuse of the mute feature comprises generating a report by an application that identifies the contact center agent that answered the call having the duration that is less than the threshold value along with the duration of the answered call.

* * * * *